April 19, 1966     B. BOUDOURESQUES     3,247,077
NUCLEAR FUEL ELEMENT
Filed Aug. 19, 1963
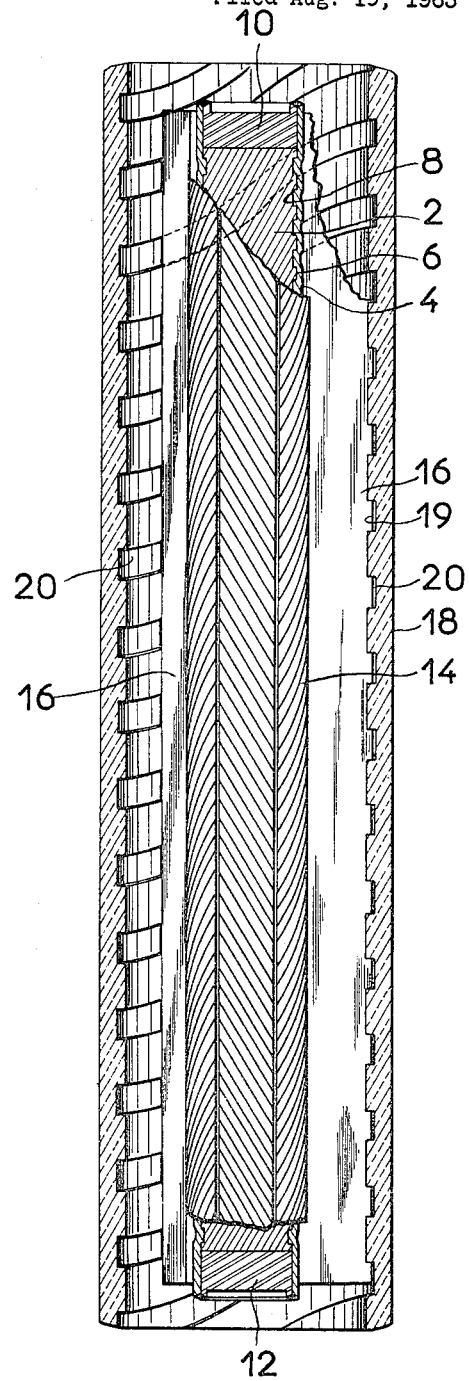

United States Patent Office 3,247,077
Patented Apr. 19, 1966

3,247,077
NUCLEAR FUEL ELEMENT
Bernard Boudouresques, Paris, France, assignor to Commissariat a l'Energie Atomique, Paris, France
Filed Aug. 19, 1963, Ser. No. 303,030
Claims priority, application France, Aug. 20, 1962,
907,266
3 Claims. (Cl. 176—81)

The present invention relates to a nuclear fuel element in which the fissile or fertile material is surrounded by a sheath, which is in turn disposed in a jacket consisting of a material having a low neutron absorption coefficient.

Known fuel elements of this type include those in which the fuel-sheath assembly, generally called the cartridge, is maintained at the center of a graphite jacket by means of longitudinal partitions by which it is centerally maintained and its mechanical strength is increased. The cartridge rests at its lower end on a support having small dimensions, which is connected to the base of the jacket by flexible metal wires. In this form, each cartridge is completely supported by the jacket associated therewith, whereby the compressive stresses to which the plug closing the end of the sheath at which it rests on its support are to a very large extent reduced.

When fuel elements of the aforesaid type are stacked inside a nuclear reactor channel, the external graphite jackets support alone the weight of the elements superposed thereon, whereby the individual loading of each of the plugs is reduced.

However, under some operating conditions, notably when the fuel elements are to be maintained at a high temperature, the force exerted on the lower plugs may still be prohibitive and bring about flow of the material of which they are formed, more especially when the cartridges are of great length and the plugs themselves are of small surface.

The invention has for its object to obviate the aforesaid disadvantages by means of an arrangement for eliminating every force exerted on the lower plugs.

It consists mainly in that, while the sheath of each cartridge comprises longitudinal centering partitions extruded integrally with the sheath, the lateral edge of the said partitions are recessed in toothed form, and the inside wall of the outer jacket is formed with continuous helical grooves so as to enable the cartridge to be screwed into the interior of the jacket.

The centering partitions support the entire weight of the corresponding cartridge. The plug which closes the lower end of the cartridge, and more especially the welded joint between the plug and the body of the sheath, are completely relieved of load. In addition, a small radial clearance is provided between the helical thread in the jacket and the teeth machined in the partitions for taking up the differential expansions of the fuel cartridge and of the supporting jacket during the operation of the reactor.

The invention will now be described by way of example with reference to the accompanying drawing, the single figure of which illustrates in elevation and partly in section a fuel element designed in accordance with the invention.

The illustrated fuel element is intended, for example, for use in a graphite-moderated reactor cooled by circulation of carbon dioxide gas through vertical channels provided within the moderator. Of course, the invention is also applicable to fuel elements for other types of reactors, notably to liquid-moderator reactors provided with force tubes, to reactors having horizontal channels, etc.

The element comprises a central fuel portion 2 consisting, for example, of pure or slightly alloyed uranium and disposed within a metal sheath 4 consisting of a material having low neutron absorption and satisfactory mechanical properties at high temperature, such as a magnesium-zirconium alloy having a low zirconium content. The fuel rod 2 is advantageously formed with circular or helical grooves such as 8 in its external surface. During the canning of the rod, the sheath 4, originally having a smooth inside surface, is applied by hydrostatic pressure, for example, to the central rod and thus fills the grooves 8 situated between the ribs 6. The sheath is thus held completely fast on the rod, whereby excellent adhesion of the metal to the fuel is afforded, while in addition the effect of the slipping of the sheath on the rod, known as "ratcheting," is avoided.

The sheath 4 is closed at each end by welded plugs 10 and 12, for example of magnesium-manganese alloy having a very low manganese content, or of magnesium-zirconium alloy. In addition, the sheath 2 comprises on its outer surface fins 14 disposed obliquely in relation to the longitudinal axis of the central rod and grouped in adjacent series. The fins of two adjacent series are so oriented as to form in combination herringbones, each set of herringbones being separated from those surrounding it by longitudinal partitions 16 extruded with the sheath 4.

In the constructional example under consideration, the number of series of fins is equal to 6, and the sheath thus comprises 3 series of herringbones separated from one another by three centering partitions such as 16. Of course, the number of series of herringbones, and consequently the number of separating partitions, may be increased or reduced in accordance with a number of parameters, notably the ratio between the diameter of the sheath and that of the outer graphite jacket 18 coaxially surrounding the canned rod.

In accordance with the invention, the sheath proper and the graphite jacket associated therewith, of which the length is very slightly longer than that of the sheath, are connected together by screwing of the cartridge into the jacket.

For this purpose, the lateral and longitudinal edges of the partitions 16 are so recessed as to form teeth 19, of which the height and width are chosen in accordance with the pitch of the screwthread to be machined into the jacket 18.

The inside surface of the said jacket is formed with continuous helical grooves 20 permitting the engagement of the teeth of the partitions 16 and the screwing of the cartridge. The respective dimensions of the teeth 19 and of the grooves 20 are such as to define between them a slight radial clearance so as to take up the relative expansions of the jacket 18 and the teeth 4 in relation to one another.

In addition to this radial clearance, it may be advantageous to provide a longitudinal clearance between the teeth of the centering partitions and the grooves of the jacket 18. The dimensions of this longitudinal clearance varies along the length of the cartridge. This clearance, preferably, is a minimum in the grooves in the upper part of the jacket and is a maximum in the grooves of the lower part thereof. Thus, when the element is screwed into the jacket, it is the upper portion of the latter that, in practice, supports the assembly formed of the sheath and the rod which it contains, whereby a fixed point is created in this region. In the course of the operation of the reactor, as the temperature gradually rises to its service temperature, the number of points of contact between the partitions of the sheath and the jacket gradually increases, since the expansion of the metal (magnesium or zirconium) is greater than that of the graphite. In this way, the contact between the two aforesaid members is improved, the dimensions of the longitudinal and radial clearances being calculated as a function of the maximum temperature reached so that this contact is as intimate as possible over the entire length of the cartridge.

Each jacket thus completely supports, by way of the lateral partitions, the weight of the fuel cartridge which it contains, the end plugs 10 and 11 and, more especially, the welded joints between the latter and the ends of the sheath not being subjected to any tensile or compressive force.

Of course, the invention is in no way limited to the embodiment described and illustrated, which has been given only by way of example. More especially, the invention finds a very advantageous application when the fuel cartridges are in tubular form with an inner sheath and an outer sheath which are cooled by two fluid circulations which are likely to create aerodynamic forces which might impair the stability of the cartridges. In addition the screwing of the element into an outer jacket is also applicable to the case of sheaths comprising longitudinal fins, some or all of which are provided with recesses similar to those provided in the centering partitions described in the example chosen.

I claim:

1. A nuclear fuel element comprising a canned cartridge of fissile material, cooling fins in herringbone pattern on the can of said cartridge, a jacket of a material having low neutron absorption spaced from and surrounding said cartridge, longitudinal centering partitions integral with the can of said cartridge along apices of said fins centering and supporting said cartridge in said jacket, the lateral and longitudinal edges of said partitions being toothed and continuous helical grooves in said jacket receiving said toothed edges, said cartridge being screwed into said jacket.

2. A fuel element as described in claim 1 including a substantially constant radial clearance during assembly between the teeth formed in said partitions and the base of said helical grooves for free differential expansion of said cartridge and of said jacket.

3. A fuel element as described in claim 1 including longitudinal clearance during assembly between the teeth of said partitions and the base of said grooves, the clearance being variable along said cartridge from a minimum value in the upper part of said cartridge to a maximum value at the lower part of said cartridge.

References Cited by the Examiner

UNITED STATES PATENTS 3,030,293   4/1962   Wyatt _____ 176—81

LEON D. ROSDOL, *Primary Examiner.*

REUBEN EPSTEIN, CARL D. QUARFORTH,
*Examiners.*

R. L. GRUDZIECKI, *Assistant Examiner.*